March 31, 1942.  J. EATON  2,278,252

CONDITION CONTROL SYSTEM AND APPARATUS

Filed July 27, 1940  2 Sheets-Sheet 1

Inventor:
John Eaton,
by Harry E. Dunham
His Attorney.

March 31, 1942.  J. EATON  2,278,252
CONDITION CONTROL SYSTEM AND APPARATUS
Filed July 27, 1940  2 Sheets-Sheet 2

Inventor:
John Eaton,
by Harry E. Dunham
His Attorney.

Patented Mar. 31, 1942

2,278,252

UNITED STATES PATENT OFFICE 2,278,252

CONDITION CONTROL SYSTEM AND APPARATUS

John Eaton, Schenectady, N. Y., assignor to General Electric Company, a corporation of New York Application July 27, 1940, Serial No. 347,994

20 Claims. (Cl. 158—28)

The invention relates to the automatic control of condition changing apparatus involving a predetermined sequence of control conditions wherein the automatic establishment of one condition is a prerequisite to controlling another condition.

The improvements of the present invention are of particular advantage in automatically controlling oil burners or the like to establish and maintain combustion properly so as to provide for automatic thermostatic house heating control. In such service the present invention provides improvement upon the automatic burner control system and apparatus described and claimed in my Patent No. 2,085,577, granted June 29, 1937. However, the present invention may be used with advantage in other automatic sequential condition control systems and apparatus where the automatic control of some desired condition corresponding to house temperature or the like is dependent upon the proper automatic establishment of a prerequisite condition corresponding to the establishment of combustion by the burner mechanism or the like.

The general object is to provide an improved prerequisite condition responsive automatic control system and apparatus for coordinating and sequencing the operation of various automatic condition responsive control elements of an automatic condition changing device such, for example, as an automatic burner or the like so as more effectively to insure proper and safe operation of the condition changing device under normal operating conditions and particularly to prevent continued operation thereof under certain abnormal conditions.

A specific object is to provide an improved combination of an electroresponsive relay with an electric timing motor operated sequencing switch mechanism for operating a condition changing apparatus such as a burner or the like to establish a desired condition under the joint control of a master condition responsive device such as a room thermostat or the like, and a prerequisite condition responsive device such as a combustion responsive switch or the like, and, if desired, also under the control of a plurality of limit or safety switches each responsive to a different abnormal condition of the condition changing apparatus.

Other specific objects are to provide an improved structure for the time sequencing switch mechanism as well as to provide an improved preset mechanically biased lockout mechanism for control by an electroresponsive control device and a time sequencing control switch mechanism so as to render the automatic condition control system inoperative in case a certain condition is not automatically established at the proper time in the sequence. In the improved lockout mechanism a mechanical biasing force is present during normal operation of the control for effecting the lockout operation. This is an improvement upon the electrically energized lockout operating means disclosed in my patent noted above.

A further specific object is to provide improved means for insuring against interruption of the sequencing cycle due to chattering of the master condition responsive control or the inadvertent opening and closing thereof during the cycle.

Further objects will be pointed out in the course of the following description of the accompanying drawings illustrating preferred forms of the invention, and in which Fig. 1 is a schematic exploded view of the improved condition sequencing control apparatus of the present invention with the various elements thereof interconnected to automatically control the starting and running operation of an oil burner under the master control of a room temperature responsive thermostat or the like.

Figure 1:
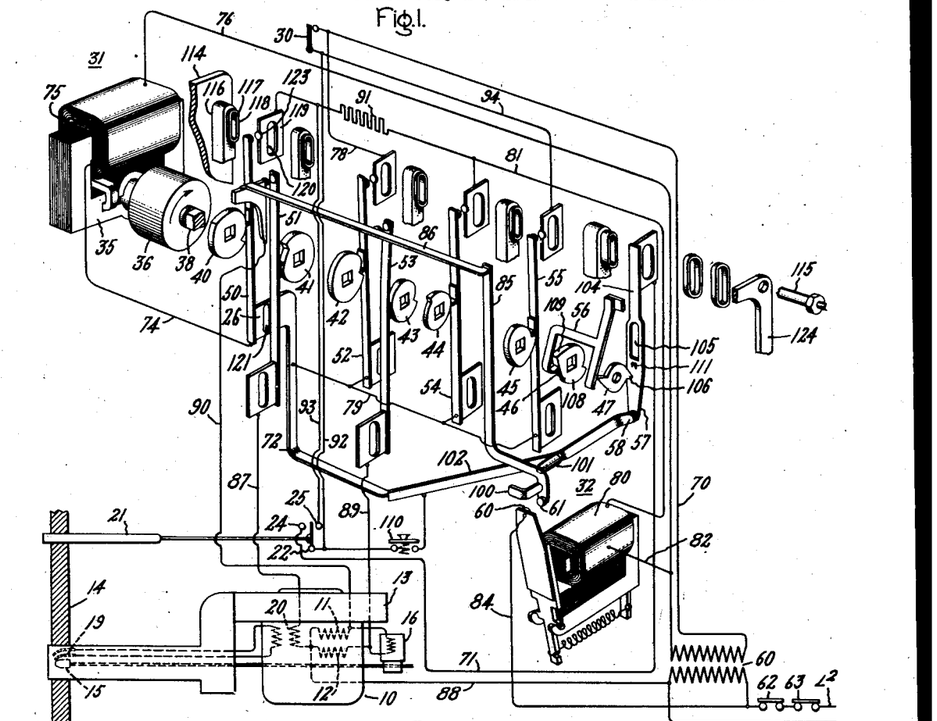

Fig. 1 schematically illustrates a preferred embodiment of the invention in an automatic oil burner control for thermostatic house heating service in order to explain the principle of the invention and the best mode in which applicant has contemplated applying that principle although the invention is not necessarily limited to burner control.

In Fig. 1, the oil burner 10 is shown diagrammatically as of the improved conversion type adapted to be used with furnaces of various types and sizes as described in the application of Aldo Macchi, Serial No. 320,557, filed February 24, 1940, although the improved control of the present invention may be employed in the control of any other form of burner or other automatically controlled condition changing device when desired. In the particular form shown the burner 10 is operated by an electric motor indicated schematically as provided with a motor running winding 11 and a motor starting winding 12 both of which are energized in starting into operation a suitable blower and oil pump mechanism (not shown in detail) to supply combustion air and atomized oil to the combustion chamber of a house heating furnace of boiler 14. After starting, the burner driving motor is operated on the running winding 11 alone. Oil is supplied from the oil atomizing nozzle 15 only when the electromagnetically operated oil valve 16 is maintained energized in addition to energization of the burner driving motor running winding 11. The air for combustion is supplied from the blower housing 13 through the air nozzle 18. The atomized oil supplied from nozzle 15 is ignited by an electric spark between the electrodes 19 which are energized from the ignition transformer 20 during the time that combustion is initially being established in the combustion chamber of the furnace 14.

A furnace combustion responsive device 21, which may be of any suitable form, is provided for operating the combustion responsive switch 22 into engagement with contact 24 in the absence of combustion and into engagement with contact 25 when combustion is successfully established. The switch 22 may be termed a prerequisite condition responsive device, with its contact 24 the "cold" contact and its contact 25 the "hot" contact.

Under normal conditions, the operation of the burner 10 is both started and stopped by a master condition responsive switch 30 which is automatically operated in accordance with variations in some predetermined condition such as temperature, pressure or any other condition to be controlled. Ordinarily, for house heating service the master switch 30 is a thermostatically operated switch suitably located in the room of the house heated by the furnace 14 in order to maintain a uniform temperature therein.

In accordance with the present invention the master condition control or room thermostat 30 operates in conjunction with the prerequisite condition responsive control or combustion condition responsive switch 22 to control the energization of the electric motor driven time switch mechanism 31 which in cooperation with the electro-magnetically operated relay 32 controls in a proper timed sequence the energization of the burner motor running winding 11, starting winding 12, the electromagnetically operated oil valve 16 and the ignition transformer 20 to start operation of the burner mechanism in an attempt to establish combustion in the combustion chamber of the furnace 14 and maintain combustion therein as long as the master or room thermostatic switch 30 is calling for heat and no abnormal operating conditions are encountered. Special provision is made so that in case some abnormal operating condition such as failure to establish combustion properly, failure of the electric power supply, the development of an excessive temperature or pressure in the furnace 14 or failure of the control apparatus itself to function properly, the burner will automatically be shut down. In the form of control apparatus shown in Fig. 1, a special two-try lockout switch mechanism (shown in Fig. 2) is provided to enable a second attempt to be made automatically to establish combustion in case combustion fails to be established properly upon the first attempt. But if combustion again fails to be established upon the second attempt then the special two-try lockout switch is operated to shut down the burner and maintain the burner shut down until the cause of the failure of combustion is eliminated and a special reset switch manually operated to restore the automatic control of the burner.

Figure 4:
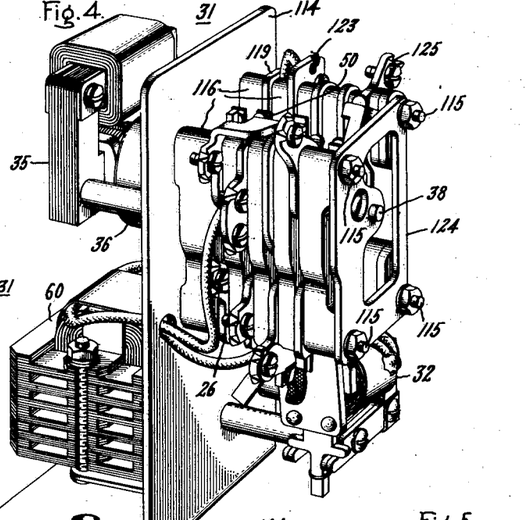
Fig. 4 is a perspective assembled view of the condition sequencing control apparatus shown in Fig. 1.

The electric motor driven time sequencing switch mechanism 31 is of an improved construction which is shown schematically with the various parts thereof in exploded or separated form in Fig. 1 in order more clearly to illustrate the details of construction. The assembled form of the sequencing switch mechanism 31 is shown in Fig. 4.

In the improved construction shown in Fig. 1 an electric timing motor 35, preferably of the synchronous self-starting alternating current type operates through suitable speed reducing gearing in the housing 36 to drive a cam shaft 38 having a plurality of switch operating cams 40, 41, 42, 43, 44, 45, and 46, all of which rotate simultaneously upon rotation of the shaft 38. A special floating lockout cam 47 is rotatably mounted upon the end of the shaft 38 so as to be frictionally driven thereby to provide for two-try lockout control as described hereinafter.

Each of the cams 40, 41, 42, 43, 44 and 45 operates a corresponding movable switch member 50, 51, 52, 53, 54 and 55 in a sequence which is predetermined by the relative shape and position of the respective cams. Cam 46 controls a movable stop or positioning member 56 which repositions the floating lockout cam 47 after it effects the separation of the normally closed lockout contacts 57, 58 when the electromagnetically operated switch or relay 32 is deenergized while the lockout cam 47 is in a predetermined position as will be explained more fully hereinafter in connection with Fig. 2.

The cam switches 51 and 53 operate in conjunction with the contacts 60 and 61 of relay 32 to control the energization of the ignition transformer 20, the run and start windings 11 and 12 of the burner motor and also the electromagnetic oil control valve 16 directly from an electric power supply line L1, L2 which may be the ordinary house service line. Thus, in the improved control of the present invention, all the high voltage control circuits preferably are segregated on one side of the operating cam shaft while all of the low voltage control switches 50, 52, 54, 55 and 57, 58 are on the opposite side of the cam shaft. These low voltage control switches are energized from the low voltage secondary of the transformer 60, the primary windings of which are connected directly to the power supply lines L1, L2, preferably through the burner, boiler, or furnace limit or safety control switches 61 and 62. These limit or safety switches are of the normally closed type and are provided with suitable automatic operating means (not shown) responsive to excessive temperature, pressure, low water, or the like for shutting down the burner under abnormal operating conditions as is well known in the art.

*Operation of Fig. 1*

The improved control schematically shown in Fig. 1 operates as follows: With the power supply lines L1, L2 energized and the safety limit switches 62, 63 normally closed, the control transformer 60 is maintained energized as long as the conditions to which the safety limit switches 62, 63 respond remain normal. Also under normal conditions the lockout contacts 57, 58 are closed and in the absence of combustion, the combustion responsive switch 22 is normally operated into engagement with its cold contact 24 by means of the combustion responsive device 21. Thus normally whenever the master control switch 30 is closed by a fall in room temperature, assuming that the master switch 30 is a room thermostat, then a starting circuit for starting the sequence timing motor 35 is established. This starting circuit extends from the low voltage secondary of transformer 60 through conductor 70, master switch 30, flame responsive switch 22 in its cold position, conductor 71, the normally closed lockout contacts 57 and 58, the conductor bar 72, conductor 74, the energizing winding 75 of the timing motor 35 and then through conductor 76 back to the secondary of transformer 60. As indicated in the sequence chart of Fig. 3, rotation of the cam shaft 38 from its initial or zero time position causes after 3 seconds the operation of cam 42 to close control switch 52 and thereby establish the #1 interlock or time switch running circuit. This circuit extends from the secondary of transformer 60 through conductor 70, conductor 78, cam switch 52, conductor 79, conducting bar 72, and thence through conductor 74, the energizing winding 75 of timing motor 35 and conductor 76. This #1 interlock or time switch running circuit maintains the timing motor 35 energized independently of the master control 30, combustion responsive switch 22, the lockout contacts 57, 58 as long as the cam operated switch 52 remains closed. This insures that the timing motor 35 will continue to operate the cam shaft 38 through a complete revolution until cam 42 is returned to its initial position in which the control switch 52 is opened, thus insuring a timed sequence of operation indicated as 60 seconds in the sequence diagram of Fig. 3.

After 4 seconds of operation of the timing motor 35, cam 41 closes switch 51 to establish the ignition circuit for the oil burner 10 as soon as the contacts 60, 61 of relay 32 are closed which, however, does not occur until later in the burner starting cycle. Likewise after 8 seconds of operation of the timing motor 35, cam 43 closes switch 53 to establish an energizing circuit for the starting winding 12 of the burner motor as soon as contacts 60 and 61 of relay 32 are closed. The closure of relay 32 occurs after 19½ seconds of operation of the timing motor 35 at which time cam 44 closes switch 54 to complete the #3 interlock or relay energizing circuit for the operating winding 80 of relay 32. This #3 interlock or relay energizing circuit may be traced from the secondary of transformer 60 through conductor 70, conductor 78, control switch 52 in its closed position, and then through conductor 79 and control switch 54 in its closed position, conductor 81, the energizing winding 80 and conductor 82.

Upon closure of the contacts 60 and 61 of the relay 32 due to closure of the relay energization circuit for the operating winding 80 in the manner just described, the ignition transformer 20 is energized through a circuit extending from L2, safety limit switches 62, 63, conductor 84, the flexible conducting arm 85 upon which contact 61 is mounted, the bus bar 86, switch 51, conductor 87, and then through the primary winding of the ignition transformer 20 and conductor 88 to the supply line L1. At the same time both the starting winding 12 and the running winding 11 of the burner motor are energized. The energizing circuit for the starting winding 12 extends from bus bar 86 through switch 53 and conductors 89 and 88 and the circuit for the running winding extends directly from bus bar 86 through conductors 90 and 88. This results in starting the burner motor into operation with the ignition electrodes 19 energized. However, combustion cannot be established until the oil valve 16 is energized to admit oil to the burner nozzle 15. The oil valve 16 becomes energized when the switch 53 is opened at 23½ seconds to deenergize the starting winding 12 of the burner motor. Thereupon the oil valve 16 is energized by the voltage induced in the starting winding 12 due to the continued energization of the motor running winding 11.

Figure 3:
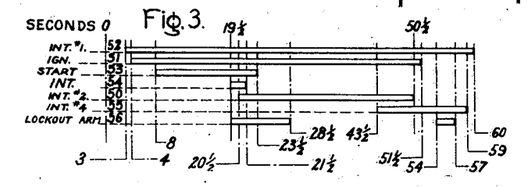
Fig. 3 is a chart showing the sequence of operation of the various cam switches of the sequencing control shown in Fig. 1.

As indicated in the sequence chart of Fig. 3 the relay energizing circuit control switch 54 remains closed only for two seconds, namely, from 19½ to 21½ seconds. During this short interval, namely at 20½ seconds, switch 50 closes to establish the #2 interlock or relay transfer circuit for maintaining the operating winding 80 of relay 32 energized through the holding resistor 19 until switch 50 opens at 50½ seconds. The #2 interlock or relay transfer circuit controlled by switch 50 extends from the secondary of transformer 60 through conductor 70, conductor 78, switch 52 in its closed position, conductor 79, conducting bar 72, switch 50 in its closed position, and thence through the voltage reducing resistor 91, conductor 81, the energizing winding 80 of relay 32 and conductor 82 to transformer 60. The inclusion of the voltage reducing or holding resistor 91 in the circuit insures that relay 32 cannot reclose in case of a temporary voltage failure during the time that the voltage reducing resistor 91 is in circuit with the operating winding 80 of the relay.

When the oil valve 16 is energized due to the opening of switch 53 to deenergize the starting winding 12 of the burner motor, oil normally is supplied to and atomized from the nozzle 15 in an attempt to ignite the atomized oil by the spark between the ignition electrode 19 and thereby establish combustion in the combustion chamber of furnace 14. In case combustion is successfully established, the combustion responsive device 21 operates switch 22 out of engagement with its cold contact 24 and into engagement with its hot contact 25. This establishes the relay holding circuit for maintaining the winding 80 of relay 32 energized with the voltage reducing or holding resistor 91 in circuit therewith under the joint control of the combustion responsive switch 22 and the master control switch 30. This relay holding circuit extends from the secondary of transformer 60 through conductor 70, the master control switch 30, conductor 92, switch 22, the "hot" contacts 25, conductor 93, resistor 91, conductor 81, winding 80, and conductor 82. The relay holding circuit is maintained independent of the cam switches 52 and 50 as the timing motor 35 continues in operation to complete the cycle but the closure of cam switch 55 establishes the #4 interlock or sealing circuit around the master control 30 during the period from 43½ seconds to 59 seconds as indicated in Fig. 3. This #4 interlock or sealing circuit shunts the contacts of the master control 30 so as to insure against interruption of the relay holding circuit due to any accidental chattering or inadvertent opening of the master control contact during this period. The #4 interlock sealing circuit extends from the terminal of the master switch 30 which is connected to the transformer by conductor 70 through conductor 78, switch 52 in its closed position, conductor 79, switch 55 in its closed position and then through conductor 94 to the other terminal of the master control switch 30. By means of this #4 interlock sealing circuit, the relay 32 is maintained energized with the voltage reducing resistor 91 in circuit therewith after the #2 interlock or relay transfer circuit is interrupted at the 50½ seconds time by opening of switch 50. Thus by means of this #4 interlock or sealing circuit, the deenergization of the relay 32 during the period from 50½ seconds to 59 seconds is placed solely under the control of the combustion responsive switch 22 as the master control switch 30 is shunted and therefore rendered ineffective to deenergize relay 32 during this period. The timing motor 35 continues operation to open the switch 51 after 51½ seconds and thereby deenergizes the ignition transformer 20 and is itself deenergized at the end of 60 seconds by the opening of switch 52. After combustion is thus normally established, the burner 10 normally will continue to run until the master switch 30 opens its contacts.

During normal burner operation as just described, the lockout switch is normally ineffective as contacts 57 and 58 remain closed as they are normally biased into engagement and thus are maintained normally ineffective. The normal initial and final relative positions of the lockout contacts 57 and 58 and of the floating lockout cam 47 and its positioning arm 56 which is controlled by the positioning cam 46 are diagrammatically illustrated in the upper O section diagram of the first cycle of Fig. 2. When flame is properly established during the first cycle, all of the lockout cam parts after a complete revolution in a clockwise direction as shown by the arrow of cams 46 and 47 without any relative movement therebetween return to their initial position as shown when the timing motor 35 is deenergized at the end of the cycle. However, during each cycle the normally closed lockout contacts 57, 58 are bodily moved as a unit without disengagement thereof to the position indicated at 19½ seconds upon closure of the relay 32. Such bodily movement of the normally ineffective lockout contacts 57, 58 is accomplished upon energization of relay 32 in the following manner. When the movable contact 60 of relay 32 is brought into engagement with the contact 61, the latter due to its mounting on the resilient conductor 85 is moved away from the stop 100. This movement of contact 61 is transmitted through the insulating pin 101 to the resilient spring arm 102 which is mounted at one end on the conducting bar 72 and carries at the other end the lockout contact 58. In the resulting movement of contact 58 the lockout contact 57 is bodily carried along due to its resilient support 104 which biases contact 57 into engagement with contact 58. Thus as shown in the upper 19½ second diagram of the first cycle of Fig. 2 the contact 57 is moved against its bias out of the path of rotational movement of the floating lockout cam 47 when relay 32 is energized.

In case combustion should not be successfully established during the first burner starting time cycle, then deenergization of relay 32 occurs upon the opening of switch 50 at a time 50½ seconds after the cycle started since the combustion switch 22 fails to engage with the hot contact 25. However, deenergization of the relay 32 at this particular time does not cause the separation of the normally ineffective lockout contacts 57, 58 as the tip of the lockout cam 47 is then in position to enter the opening 105 formed in the flexible support 104 for the lockout contact 47 as shown in the upper 50½ second diagram of the first cycle of Fig. 2. However, the continued rotation of the timing motor 35 to the end of the 60 second first timing cycle results in the engagement of one of the fingers 106 extending from the cam 47 with the bottom edge of opening 102 thereby stopping further rotation of cam 47. Cam 46, however, continues rotation to its initial position as shown in the diagram zero seconds for the second time cycle.

When the #1 interlock circuit for energizing timing motor 35 is interrupted by the opening of switch 52 at the end of the first cycle, the timing motor 35 still remains energized to start the second cycle through initial timing motor energizing circuit which includes the master control 30, the combustion responsive switch 22 in engagement with the cold contact 24, and the normally closed lockout contacts 57, 58. During the second cycle, the sequence of operation of all of the parts of the control are precisely the same as during the first cycle except that the relative position of the lockout cam 47 with respect to cam 46 is changed. Cam 47 remains locked against rotation by engagement with the bottom edge of opening 105 until the relay 32 is energized at 19½ seconds in the second cycle. Thereupon the floating lockout cam 47 is released for rotation by the disengagement of the finger 106 from the edge of the opening 105. Hence cam 47 will thereafter rotate simultaneously with cam 46, being frictionally driven from the shaft 38. Consequently, upon slightly more than a half revolution of the shaft 38, the lockout cam 47 will be in the predetermined position shown at the 50½ second time. At this particular time in the controlled sequence of operation of the time switch mechanism 31, switch 50 opens to interrupt the #2 interlock circuit. If combustion has not been established and the combustion responsive switch 22 operated into engagement with the hot contact 25 prior to this time, then relay 32 will become deenergized. The deenergization of relay 32 at this particular time results in rendering the lockout control effective to deenergize the timing motor 35 since the floating lockout cam 47 is then in the path of movement of the resilient arm 104 upon which the lockout contact 57 is mounted and thereby blocks movement of contact 57 to follow movement of contact 58 in accordance with its bias. Thus when the resilient arm 102 upon which the lockout contact 58 is mounted moves in accordance with its bias to maintain the insulating pin 101 in engagement with the relay contact 61, separation of the lockout contact 58 from the blocked contact 57 occurs. Thus when the #1 interlock circuit is interrupted by the opening of switch 52 at the end of the second cycle, further operation of the timing motor 35 is stopped due to the separation of the lockout contact 58 from the block lockout contact 57. Such lockout operation after two tries at starting indicates that there must be something wrong with the oil burner that prevents the automatic establishment of the combustion. The second cycle provides for an additional attempt to establish combustion which may have failed during the first cycle due merely to some temporary or vagrant condition.

To restart the automatic operation of the burner after a lockout, the normally open reset switch 110 is closed preferably after the burner difficulty is eliminated. This establishes a shunt reset circuit around the separated lockout contacts 57, 58 and the combustion responsive switch 22 in its cold position so that irrespective of the opening of these switches the timing motor 35 may be energized with the master control 30 closed. The reset switch 110 must then be maintained closed until the #1 interlock circuit is established by closure of switch 52 in the first cycle after reset. Thereupon the timing motor 35 will automatically be maintained energized until the end of the cycle as previously described. During this cycle the lockout cam 47 is held locked in position by engagement with the upturned finger 111 as indicated in the zero second diagram of the first cycle after reset. Lockout cam 47 is released from finger 111 only when the relay 32 is energized at the 19½ second time as shown in the second diagram. Thereupon cams 47 and 46 rotate together. The positioning arm 56 is lifted out of the path of the finger 106 extending from cam 47 by the cam face 108 on cam 46 as shown in the 19½ to 28½ second period of Fig. 3.

If combustion should be properly established in the first cycle after reset, relay 32 will be maintained energized at and after the 50½ seconds time by the operation of the combustion responsive switch 22 to its hot position. Shortly thereafter the finger 106 of the lockout cam 47 will engage with the positioning arm 56 as indicated in the 50½ second diagram in the first cycle after reset. This engagement with positioning arm 56 stops rotation of cam 47 until the positioning arm 56 is moved out of the path of the finger 106 by the cam face 109 of cam 46 at the 54 to 57 second time as indicated in Fig. 3. This results in the return of lockout cam 47 into its normal position with reference to cam 46. Thus all of the parts of the lockout are returned to their normal operating condition as shown in the zero second time in the second cycle after reset with flame established. From this point on the control automatically will provide two attempts at establishing combustion before lockout the same as originally described. In fact after reset three tries at attempting combustion are available whether flame is or is not properly established in the first cycle after reset as described above.

If combustion is not properly established in the first cycle after reset, the lockout contacts 57 and 58 remain closed even though relay 32 is deenergized at the 50½ seconds time due to the failure of the combustion responsive switch 22 to move to the hot position. The position of the lockout cam 47 at the 50½ seconds time in the first cycle after reset is sufficiently advanced so as no longer to engage with the projecting finger 111. Consequently the lockout cam 47 continues to be rotated by the continued operation of the time switch 35 in precisely the same way as it would have been if flame had been established during the first cycle after reset. Hence cam 47 arrives at the same position at the zero seconds time starting the second cycle after reset whether flame is or is not established during the first cycle after reset.

Figure 2:
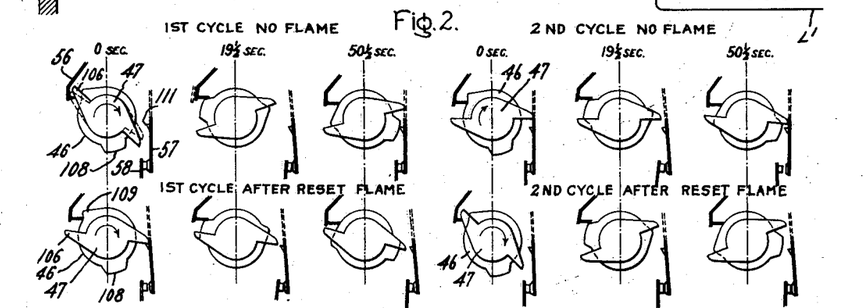
Fig. 2 is a diagram showing the relative positions of an improved two-try lockout control part during both normal and abnormal operation of the burner.

With the improved lockout mechanism of the present invention, a voltage failure does not effect the lockout action except in case voltage should happen to fail during the very short time interval that one of the fingers of said lockout cam 46 is in the particular position shown at the 50½ seconds time in the second cycle with no flame in Fig. 2. Thus it is only when the relay 32 is deenergized at this particular time with the lockout cam in this particular position that lockout occurs. The positioning arm 56 and the positioning cam 46 insures that the lockout cam 47 is returned after lockout operation to this particular position at this particular time under normal operating conditions.

Timing switch construction

Fig. 4 shows the electric motor driven time switch mechanism 31 of Fig. 1 in its assembled form. The timing motor 35 and the transformer 60 are mounted on one side of the supporting plate 114 and all of the cam operated switches as well as the relay 32 are mounted on the other side. The several cam operated switches are of a special improved construction so that they may be assembled in closely aligned relation upon the four studs 115 which extend in spaced apart relation from the base 114. A plurality of suitably formed insulating blocks 116 are interposed between the several switch parts so as to electrically insulate them from the studs 115 as well as from each other. The detailed construction of the insulating blocks 116 and the cooperating switch parts are indicated more clearly in the exploded view of Fig. 1. Each of the insulating blocks 116 is provided with an opening 117 at each end for receiving one of the studs 115. Each opening 117 extends through a non-circular boss 118. As all of the cam switches are of similar construction only one need be described in detail as for example switch 50.

The contact plate 119 of switch 50 is provided with a non-circular opening 120 for slidably mounting the contact plates on the boss 118. The switch contact 123 is mounted on the edge of the plate 119. The separate metal plate or conducting bar 72 upon which the movable switch member 50 is mounted is provided with a non-circular opening 121 for slidably mounting the plate 26 over the corresponding non-circular block at the lower end of the insulating block 116. Thus when the next insulating block 116 in the series is threaded over the stud 115, and the next succeeding switch parts are mounted upon the non-circular bosses thereof, a very compact sandwich switch structure is obtained as shown in Fig. 4. An end plate 124 provided with a central bearing opening for the end of the cam shaft 38 is provided with spaced openings for receiving the ends of the four studs 115. By tightening up the nuts on the threaded ends of the studs 115, the plate 124 is drawn inwardly so as to clamp all of the blocks 116 together with the switch parts clamped in proper position on the bosses 118 between the adjacent insulating blocks.

Each of the switch parts 119 is provided with a suitable wiring terminal holding means either of the screw clamp type as shown at 125 or of the soldered or welded type shown at 123. The soldered or welded wiring terminal holding means is used for the permanent connections to integral parts of the timing switch mechanism 31 while the screw clamp type of wiring terminal holding means provide removable connections to the non-integral parts of the burner control system.

This facilitates the interconnection of the timing switch mechanism with the master control, the combustion switch, the various elements of the burner and also the power supply line. As previously pointed out the high voltage connections preferably are all on one side of the cam shaft while the low voltage control connections are on the other side.

One-try lockout

Figure 5:
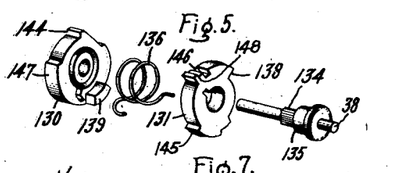
Fig. 5 is a perspective exploded view of an improved form of one-try lockout mechanism which may be used with the sequencing control apparatus shown in Figs. 1 and 4 to provide for only one try in establishing combustion upon starting the burner into operation.

The improved one-try form of lockout cam mechanism shown in Fig. 5 may be employed with a time sequence switch and relay mechanism similar to that shown in Figs. 1 and 4, if desired. In this modified control the special cooperating lockout cams 130 and 131 are substituted for the cams 46 and 47 and the positioning arm 56 is eliminated. The resilient arm 104 upon which the lockout contact 57 is mounted is provided with a special lockout finger 132 for cooperating with the cams 130 and 131 as shown diagrammatically in Fig. 6. The cam shaft 38 of the time switch mechanism is provided with a knurled section 134 upon which the cam 130 is fixedly mounted. The cam 131 is rotatably mounted upon the section 135 with the torsion spring 136 interconnecting the cams 130 and 131 so as to bias the shoulder 138 of cam 131 into engagement with the stop 139 of cam 130 as indicated at the zero seconds time in Fig. 6.

Figure 7:
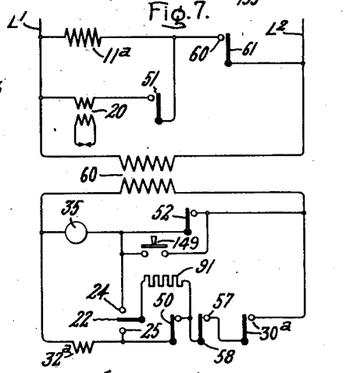
Fig. 7 is a connection diagram for the sequencing control apparatus of Figs. 1 to 4 with the one-try lockout mechanism of Figs. 5 and 6 in control of a simplified form of oil burner.

The one-try lockout cam mechanism is particularly advantageous for use when the time sequencing switch mechanism 31 and relay 32 are employed for controlling a simplified form of oil burner having simply an ignition circuit and a motor running circuit as shown schematically in Fig. 7. In such service the sequencing switch mechanism may be materially simplified as there is no need for the motor starting control switch or the oil valve connections shown in Fig. 1 and hence these may be eliminated. Also the control circuits may be materially simplified as shown in Fig. 7.

The operation of the simplified one-try control is as follows: Upon closure of the contacts of the master control switch 30, a starting circuit for timing motor 35 is established from the secondary of transformer 60 through contacts 30 in their closed position, the normally closed lockout contacts 57, 58, the resistor 91, the combustion responsive switch 22 in its cold position in engagement with contact 24 and thence through the timing motor 35 to the other side of the transformer secondary. The resulting timing motor operation closes cam switch 52 after 3 seconds as shown in the chart at the bottom of Fig. 6. The closure of switch 52 establishes the #1 interlock or timer running circuit for insuring the continued energization of the timing motor 35 until the end of the 60 second time cycle. This #1 interlock or timer running circuit extends from the transformer secondary through cam switch 52 in its closed position and then directly through the timing motor 35 to the other side of the transformer secondary. The closure of cam switch 51 at the 5 second time connects the primary of the ignition transformer 20 to be energized from the high voltage power supply lines L1, L2 in shunt with the motor running winding 11a upon subsequent closure of the contacts 60, 61 of the relay 32.

The operating winding of relay 32 is energized to close the relay contacts 60 and 61 when switch 50 closes to establish the #2 interlock circuit at the 18 second time. This #2 interlock or relay energizing circuit extends from the transformer through the contacts of master control switch 30 in their closed positions, through the normally closed lockout contacts 57, 58 and then through cam switch 50 in its closed position, contact 25 of the combustion responsive switch and winding of relay 32 to the other side of the transformer. The resulting closure of relay 32 energizes both the burner motor running winding 11a and ignition transformer 20. Thus combustion should normally be established in the interval from 18 to 57 seconds during which the switch 50 is maintained closed. If combustion is successfully established, the combustion responsive switch 22 is operated out of engagement with its cold contact 24 and into engagement with its hot contact 25. In the latter position the combustion responsive switch 22 establishes a relay holding circuit that will maintain the relay operating winding 32 energized through the voltage reducing resistor 91, the normally closed contacts 57, 58 of the lockout switch and the contacts of the master control 30 irrespective of the opening of the cam switch 50 at the 57 second time. Thereafter in case of failure of combustion the combustion responsive switch 22 will disengage contact 25 and thereby open the relay holding circuit to deenergize the relay operating winding 32. Likewise if the master control switch 30a opens its contacts the relay holding circuit for operating winding 32a is deenergized to shut down the burner operation.

When combustion is successfully established as just described above, the one-try lockout control operates as follows. At the start of the cycle, the lockout cams 130, 131 are in the relative position with respect to the lockout contacts 57, 58 as shown in the zero time diagram of Fig. 6. After the closure of cam switch 52 at 3 seconds and before the closure of the cam switch 50 at 18 seconds, the engagement of the finger 144 on cam 130 with the finger 132 on lockout contact 57 although it separates the lockout contacts 57, 58 temporarily cannot interrupt the #1 interlock energizing circuit for the timing motor 35. After finger 144 has passed finger 132 then the shoulder 145 on cam 131 is brought into abutting engagement with finger 132. This will stop rotation of cam 131 which, as previously pointed out, is free to rotate upon section 135 of the cam shaft against the torsion of spring 136. When combustion is successfully established after closure of switch 50 at the 18 second time, the lockout contacts 57, 58 are moved bodily as a unit by the resulting energization of the relay 32 in exactly the same way as described in connection with Fig. 1. This carries the finger 132 entirely out of the path of both of the lockout cams 130 and 131 as indicated in the lower diagram at the 18 second time with relay 32 closed. The resulting disengagement of finger 132 from shoulder 145 allows the cam 131 to be rotated by spring 136 back to its original relative position with respect to cam 130. Thus when the relay 32 is maintained energized by switch 22 due to establishment of combustion during the 18 to 56 second period of operation of sequencing switch mechanism, then the lockout cams 130 and 131 will be returned to their initial position at the end of the cycle. Upon subsequent deenergization of the relay 32, the lockout contacts 57, 58 remain in their normally closed or normally ineffective condition.

Figure 6:
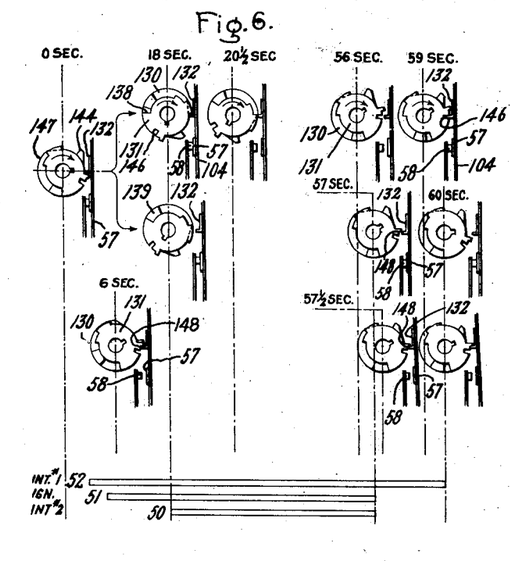
Fig. 6 is a diagram showing the relative position of the one-try lockout parts shown in Fig. 5 during the sequential operation of the control mechanism.

When the timing cycle is once started, if the relay should fail to close at the 18 second time for any reason, then the burner will not be started and as indicated at the 20½ second diagram of Fig. 6, the cam face 147 on cam 130 engages with the finger 132 so as to separate lockout contact 57 from contact 58. Under these conditions with relay 32 still not closed at the 56 second time, finger 132 will engage with the edge of the slot 146 formed in the cam 131. This will arrest rotation of cam 131 and when the continued rotation of cam 130 brings the shoulder 147 on cam 130 past the finger 132, then the finger 132 drops into the slot 146 so as to permit reclosure of the lockout contacts 57, 58 at the 59 second period. This will maintain the initial energizing circuit for timing motor 35 so that the cycles can be repeated to attempt to energize relay 32 at the 18 second time. The energization of the timing motor 35 will be continued indefinitely in case the relay 32 is never closed during the 18 to 56 second time but of course the burner will never operate.

In case relay 32 is properly energized at the 18 second time by closure of switch 50 to establish the #2 interlock circuit and the relay 32 is deenergized at the 57 second time by opening of switch 52 without the combustion switch 22 having responded to move to the hot position, then the lockout contacts 57, 58 are rendered effective to stop further energization of the timing motor 35 at the end of the 60 second period as follows. When relay 32 is energized prior to the 56 second time and becomes deenergized immediately after the 57 second time the notch 148 on cam 131 is operated into the path of the finger 132 at this particular time so as to effect a lockout separation of contacts 57, 58 as shown in the 57½ second diagram. This separation of lockout contacts 57, 58 will be maintained to the end of the 60 second period so that the timing motor 35 is not energized thereafter and the lockout thus becomes effective.

To restart the burner into operation after lockout, it is necessary to manually close the normally open reset switch 149 in order to reenerigze the timing motor 35 directly from the transformer secondary. The resulting rotation of the timing motor carries the finger 144 of cam 130 into engagement with the finger 132 so as to disengage the latter from the notch 148 on cam 131 as indicated in the 6 second diagram to effect a mechanical reset of lockout. This permits the spring 136 to rotate cam 131 back into its initial relative position with respect to cam 130. Thus the improved one-try lockout mechanism again becomes normally ineffective and is thereafter rendered effective only when the relay 32 is deenergized at the particular time that the notch 148 on lockout cam 131 is operated by the time sequencing mechanism into the path of the finger 132 on lockout contact 57.

Figure 8:
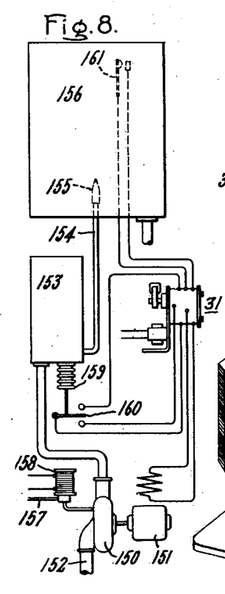
Fig. 8 is a schematic diagram showing the improved condition responsive automatic sequencing control system and apparatus of the present invention adapted for automatic humidity control service.

The improvements of the present invention are not necessarily limited to burner control but may be employed with advantage in other types of automatic prerequisite condition control such, for example, as the humidity control system shown diagrammatically in Fig. 8. As shown, the centrifugal pump 150 is driven by the electric motor 151 to pump water through the supply pipe 152 from a source which may be ineffective or insufficient into the pressure tank 153 from which the water is supplied by the pipe 154 to be discharged through the atomizing nozzle 155 to increase the humidity within the enclosure 156. Priming water is supplied from a suitable source through the pipe 157 under the control of the electromagnetic valve 158 to initially prime the pump 150. A suitable pressure responsive device 159 or a float, if desired, operates the switch 160 into engagement with the upper contacts when there is little or no water supplied to the pressure chamber 153 and into engagement with the lower contact when an effective water atomizing pressure is built up in the pressure chamber 153 by operation of pump 150. An automatic master control shown in the form of a humidostat 161 is responsive to the humidity condition within the enclosure 156.

The improved time sequencing switch mechanism relay and lockout combination of the present invention as illustrated in Figs. 1 and 4 may be applied to control the operation of motor 150 under the master condition responsive control of the humidostat 161 in conjunction with the prerequisite condition responsive switch 160. In this service the timing motor 35 is connected to be energized when the pressure responsive switch 160 is in engagement with its upper or no water condition contact and the humidostat 161 closes its contact. The #1 interlock circuit is closed to maintain the timing motor 135 energized until the end of the starting cycle in the same way as previously described. The priming water control valve 158 is connected to be energized upon closure of the switch 51 so as to induce effective pumping operation of the pump 150 when the motor 151 is energized by closure of the relay 32. If successful water pumping is established and a water pressure is built up in the chamber 153 so as to move the pressure responsive switch 160 from its upper contacts to its lower contacts within the time interval previously described as allotted for an attempt to establish combustion, then the operation of motor 151 will be continued under the control of the humidostat 161 and the pressure responsive switch 160. The water priming valve 158 is deenergized upon opening of the switch 51. In case effective water pumping operation is not established for any reason so that an effective pressure is not built up in chamber 153 after two attempts, the improved control would automatically lock out in exactly the same way as described in connection with the burner control. The operation is generally similar except that the elements of the automatic pumping and humidifying apparatus are controlled instead of the burner elements. The one-try lockout cam mechanism may be employed in the control arrangement of Fig. 8, if desired.

What I claim as new and desire to secure by Letters Patent of the United States is:

1. In an automatic control system for a condition changing apparatus, the combination of energizing means for the condition changing apparatus including an electrical timing device, an electromagnet having a holding circuit, an energizing circuit for said electromagnet temporarily energized by said timing device, and means controlled by said electromagnet upon energization of said energizing circuit for energizing the condition changing apparatus to attempt to establish a predetermined condition, means including a device responsive to said predetermined condition for operating said timing device in the absence of said condition and for energizing said holding circuit of said electromagnet to maintain said condition when said condition is established during said temporary energization of said energizing circuit, and automatic lockout means having a pair of mechanically biased elements separately controlled by said timing means and said electromagnet for rendering said energizing means ineffective upon deenergization of said electromagnet within a limited time after a predetermined temporary energization of said energizing circuit by said timing device.

2. In an automatic burner control system, the combination of burner energizing means including an electrically operated rotatable timing device, an electromagnet having a holding circuit, an energizing circuit for said electromagnet temporarily energized during rotation of said timing device, and means controlled by said electromagnet upon energization of said energizing circuit for energizing the burner to attempt to establish combustion, means including a combustion responsive device for operating said rotatable timing device in the absence of combustion and for energizing said holding circuit of said electromagnet to maintain combustion when combustion is established during a temporary energization of said energizing circuit, and automatic means including a rotatable element operable by said timing means and a cooperating biased element operated by said electromagnet into lockout engagement with said first element for rendering said burner energizing means ineffective upon deenergization of said electromagnet within a limited time following a predetermined temporary energization of said energizing circuit by said rotatable timing device.

3. In an automatic burner control, the combination of an electrical timing device, an electromagnet having a holding circuit, an energizing circuit for said electromagnet temporarily closed by said timing device, means controlled by said electromagnet upon energization thereof for energizing the burner to attempt to establish combustion, means including a combustion responsive device for energizing said timing device in the absence of combustion and for closing said holding circuit to maintain said electromagnet energized to maintain combustion when combustion is established during a temporary closure of said energizing circuit and automatic means including a pair of elements, one operable by said timing device and the other biased by said electromagnet upon energization thereof into lockout engagement for preventing subsequent operation of said burner energizing means upon deenergization of said electromagnet within a limited time following a predetermined temporary energization of said electromagnet by said timing device.

4. In a control for an electrically operated device, the combination of control means for the device having electroresponsive operating means, a plurality of energizing circuits for said operating means, electrically operated timer for temporarily closing one of said circuits, automatic means normally effective during said temporary closure of said one circuit for closing another of said circuits, means controlling energization of said timer including relatively movable contacts biased into engagement for movement as a unit by said electroresponsive means upon energization thereof, and means including a movable stop member controlled by said timer for effecting disengagement of said contacts upon deenergization of said operating means at a predetermined time after energization of said timer.

5. In a control for an electrically operated condition changing device, the combination of control means for said device having electroresponsive operating means, a plurality of energizing circuits for said operating means, means including an electrically operated timer for temporarily closing one of said energizing circuits to establish a condition, an automatic condition responsive device effective upon establishment of said condition during said temporary closure of said one circuit for closing another of said energizing circuits and for maintaining said other circuit closed to maintain said condition thereafter, a lockout device having two normally ineffective positions for preventing energization of said operating means, and operated between said positions upon energization and deenergization of said operating means and means including a movable stop element into the path of said lockout device for rendering said lockout device effective upon deenergization of said operating means at a predetermined time when the energization of said operating means is under the control of said automatic condition responsive device.

6. In a control for a condition changing apparatus, the combination of automatic means for operating the apparatus including a relay having a plurality of energizing circuits, means including a timer for temporarily closing one of said circuits to establish a condition, a condition responsive device effective upon establishment of said condition during temporary closure of said one circuit for closing another of said circuits to maintain said condition, a lockout device having a pair of movable elements each biased into engagement with the other and separable for preventing operation of the apparatus and mechanism whereby the bias of both of said elements is jointly controlled by said relay and the bias of one of said elements is separately controlled by said timer for rendering said lockout device effective upon deenergization of said relay at a predetermined time when the energization of said relay is under the control of said condition responsive device.

7. In combination, a control relay for an electrically operated condition changing device, a normally closed lockout switch operated between two positions while maintaining said switch closed upon energization and deenergization of said relay, a plurality of energizing circuits for said relay, a timer operable under the control of said lockout switch for temporarily closing one of said energizing circuits to establish a condition, automatic condition responsive means effective upon establishment of said condition during the said temporary closure of said one circuit for closing another of said energizing circuits, and means operated by said timer into the path of said lockout switch at a predetermined time for opening said lockout switch to prevent operation of said timer upon the opening of said relay at said predetermined time.

8. In combination, an electroresponsive control device having a normally closed switch operated thereby from one position to another position while maintaining said switch closed upon energization of said device, means for biasing said switch to said one position upon deenergization of said device, a plurality of energizing circuits for said device, a timer operable under the control of said normally closed switch for temporarily closing one of said energizing circuits, automatic control means normally effective during the temporary closure of said one circuit for closing another of said circuits, and means operated by said timer into the path of said normally closed switch at a predetermined time to effect the opening of said normally closed switch upon deenergization of said electroresponsive device at said predetermined time.

9. In combination, an electroresponsive control means having a pair of circuit controlling contacts normally biased into engagement for operation as a unit upon energization of said means, a plurality of energizing circuits for said electroresponsive control means, a timer operable under the control of said contacts for temporarily closing one of said circuits, automatic means for closing another of said circuits, and means operable by said timer at a predetermined time into the path of movement of one of said contacts to effect disengagement of said contacts upon deenergization of said electroresponsive means at said predetermined time.

10. In combination, an electrically operated control device, a normally ineffective lockout switch having an operating element movable between two positions by said device, a plurality of energizing circuits for said device, a rotary timer operable under the control of said lockout switch for temporarily closing one of said circuits, automatic means for closing another of said circuits, and a rotatable stop operated by said timer at a predetermined time into the path of movement of said operating element for rendering said lockout switch effective to prevent operation of said timer upon the deenergization of said device at said predetermined time.

11. In combination, an electrically operated control device, a normally ineffective lockout switch having an operating element movable between two positions by said device, a plurality of energizing circuits for said device, a rotatable timer operable under the control of said lockout switch for temporarily closing one of said circuits, automatic means for closing another of said circuits, a relatively movable rotatable stop member operated by said rotatable timer, and means controlled by said timer upon rotation thereof for positioning said relatively movable rotatable stop member for subsequent operation by said timer upon subsequent rotation thereof into the path of said operating element at a predetermined time for rendering said lockout switch effective to prevent operation of said timer upon the deenergization of said device at said predetermined time.

12. In combination, an electrically operated control device, a normally ineffective lockout switch operated thereby, a plurality of energizing circuits for said device, a timer operable under the control of said lockout switch for temporarily closing one of said circuits, automatic means for closing another of said circuits, a pair of relatively movable lockout control members operated by said timer and biased into a predetermined relative position, and means controlled by said timer upon operation thereof for positioning one of said relatively movable members for operation by said timer into effective operating relation with said lockout switch at a predetermined time for rendering said lockout switch effective to prevent reenergization of said control device upon deenergization of said device at said predetermined time.

13. In combination, a burner, electroresponsive means for controlling the operation of said burner, said means having an energizing control circuit for controlling said burner to establish combustion and a holding control circuit for controlling said burner to maintain combustion after the establishment thereof, an electrically operated sequential circuit control timer for closing said energizing control circuit for a limited period during operation of said timer, a thermostatic switch, a starting control circuit for said timer under the control of said thermostatic switch, a running circuit for said timer automatically closed by said timer for a predetermined longer period upon the starting of operation of said timer, a combustion responsive switch interconnected with said thermostatic switch for closing the said holding control circuit of said electroresponsive means upon the establishment of combustion during said limited period, a normally closed lockout switch operated between two positions upon energization of said electroresponsive means and connected in at least one of said control circuits for preventing operation of said burner upon the opening of said lockout switch and means including a movable stop positioned in the path of said lockout switch by said timer at the end of said limited period for opening said lockout switch upon deenergization of said electroresponsive means at said time.

14. In a control system for a condition changing apparatus, the combination of an operation control device biased to stop operation of the condition changing apparatus, electroresponsive means for operating said control device to operate the condition changing apparatus to establish and maintain a first condition for changing a second condition, an energizing control circuit for said electroresponsive means, a holding control circuit for said electroresponsive means, a first control switch responsive to said first condition, a second control switch responsive to said second condition, an electrically operated sequential circuit control timer having a starting control circuit under the joint control of said first control switch in the absence of said first condition and said second control switch in response to a predetermined variation in said second condition, and a running circuit automatically closed by said timer for a predetermined period after the starting of operation of said timer with said timer connected for closing the said energizing control circuit of said electroresponsive device for an interval during said period to attempt to establish said first condition during said interval and with said holding control circuit for said electroresponsive device connected to be closed under the control of said first control switch in response to the establishment of said first condition during said interval and maintained closed under the joint control of said first control switch and said second control switch upon the opening of said running circuit at the end of said predetermined period, a normally closed lockout switch operated between two positions upon energization of said electroresponsive means and connected in at least one of said control circuits for preventing operation of the condition changing apparatus upon the opening of said lockout switch, and means including a movable stop operated by said timer into the path of said lockout switch at the end of said interval for opening said lockout switch upon the deenergization of said electroresponsive means at said time.

15. In a control system for a burner, the combination of electroresponsive burner operating means, control means for said operating means including an electrically operated timer having an energizing circuit for said operating means closed thereby for a limited interval to effect limited operation of the burner, a burner combustion responsive device having a holding circuit for said operating means closed thereby upon response thereof to combustion to continue operation of the burner after said limited interval, normally ineffective lockout means for preventing energization of said operating means, and mechanism having a biased element moved by said operating means upon energization and deenergization thereof and a cooperating stop element moved into the path of said biased element by said timer at the end of said interval for rendering said lockout means effective upon deenergization of said operating means due to the failure of said combustion responsive device to close said holding circuit before the end of said interval.

16. In a control for an electrically operated burner, the combination of a burner operation control switch biased to the open position, an electromagnet for closing said switch to operate the burner upon energization of said electromagnet, means for controlling the energization of said electromagnet including an electrically operated timer having an energizing circuit for said electromagnet closed thereby for a limited interval, a combustion responsive device having a holding circuit for said electromagnetic means closed thereby upon response thereof to combustion, and a normally closed lockout switch in control of the energization of said electromagnet and having an opening mechanism including a pair of cooperating elements, one biased by said electromagnet upon energization thereof for operation upon deenergization thereof at the end of said limited interval due to failure of said combustion responsive device to close said holding circuit and the other operated into the path of said biased element by said timer at the end of said interval.

17. In combination, an operation control relay for a condition changing apparatus, an energizing circuit for said relay, a holding circuit for said relay including means for preventing effective reenergization of said relay after a voltage failure, means for closing and opening said energizing circuit including a master control switch, an electrically operated time switch mechanism having a switch contact operable for closing said energizing circuit for an interval during operation of said mechanism, a normally ineffective lockout switch connected in said energizing circuit, a starting circuit for starting said time switch mechanism into operation under the joint control of said lockout switch and said master switch and having a running circuit and a switch contact for closing said running circuit for a predetermined period of time including said interval, an automatic switch responsive to establishment of a predetermined condition during said interval and interconnected with said master switch for jointly closing said holding circuit in response to establishment of said condition during said interval, means jointly controlled by said time switch mechanism and said relay for rendering said lockout switch effective upon failure of said automatic switch to respond within said interval, and a sealing circuit including a switch contact operated by said time switch mechanism for closing said sealing circuit to render said master control switch ineffective to open said energizing circuit of said relay within said interval.

18. In combination, condition control means having an operating electromagnet, an energizing circuit for said electromagnet, a holding circuit for maintaining said electromagnet energized, a pair of movably mounted switch members in control of said circuits and biased into circuit closing engagement, a movable control member biased to one position and operable upon energization of said electromagnet into engagement with one of said switch members to move the other of said switch members against its bias while maintaining said switch members in circuit closing engagement, an electrically operated timer for closing said energizing circuit for a limited interval, an automatic switch for closing said holding circuit in response to the establishment of a predetermined condition during said interval, and stop means operated by said timer into the path of the said other of said switch members at the end of said interval for preventing movement of said other member in accordance with its bias to effect disengagement of said switch members upon deenergization of said electromagnet at the end of said interval.

19. In combination, condition control means having an operating electromagnet, an energizing circuit for said electromagnet, a holding circuit for maintaining said electromagnet energized, a pair of movably mounted switch members biased into circuit closing engagement and connected to control said energizing circuit, a movable magnetic armature biased to one position and operable upon energization of said electromagnet to move both of said switch members while maintaining circuit closing engagement therebetween, means including a timer for temporarily closing said energizing circuit, an automatic switch for closing said holding circuit in response to the establishment of a predetermined condition during said interval, a pair of relatively movable stop members operated by said timer, one being operable into the path of one of said contact members, and means controlled by the other of said stop members for effecting relative movement of said stop members to position said one of said members for blocking engagement with said one switch member to effect disengagement thereof from the other of said switch members upon deenergization of said electromagnet at the end of said interval.

20. In combination, condition control means having an operating electromagnet, an energizing circuit for said electromagnet, a holding circuit for maintaining said electromagnet energized, a magnetic armature biased to one position and operated to another position upon energization of said electromagnet, a pair of movably mounted switch members biased into engagement for operation as a unit by said armature upon energization of said electromagnet, means including an electrically operated rotatable timing switch mechanism for closing said energizing circuit for a predetermined interval, an automatic condition responsive switch for closing said holding circuit upon the occurrence of a predetermined condition during said interval, a pair of rotatable relatively movable control members operated by said time switch mechanism one being operable into the path of one of said switch members, means controlled by the other of said control members for engaging with said one of said control members to effect relative movement between said control members for positioning said one control member for operation by said time switch mechanism into effective blocking relation with said one contact at the end of said interval for separating said switch members upon deenergization of said electromagnet at said predetermined time.

JOHN EATON.

CERTIFICATE OF CORRECTION.

Patent No. 2,278,252.                                            March 31, 1942.

JOHN EATON.

It is hereby certified that error appears in the printed specification of the above numbered patent requiring correction as follows: Page 8, first column, line 61, claim 4, before "electrically" insert --an--; second column, line 16, claim 5, after "means" first occurrence, insert a comma; line 17, same claim, after "element" insert --operated by said timer--; and that the said Letters Patent should be read with this correction therein that the same may conform to the record of the case in the Patent Office.

Signed and sealed this 2nd day of June, A. D. 1942.

(Seal)
Henry Van Arsdale,
Acting Commissioner of Patents.